J. L. WOODBRIDGE.
SYSTEM OF ELECTRICAL DISTRIBUTION.
APPLICATION FILED JUNE 22, 1912.
1,067,631.
Patented July 15, 1913.
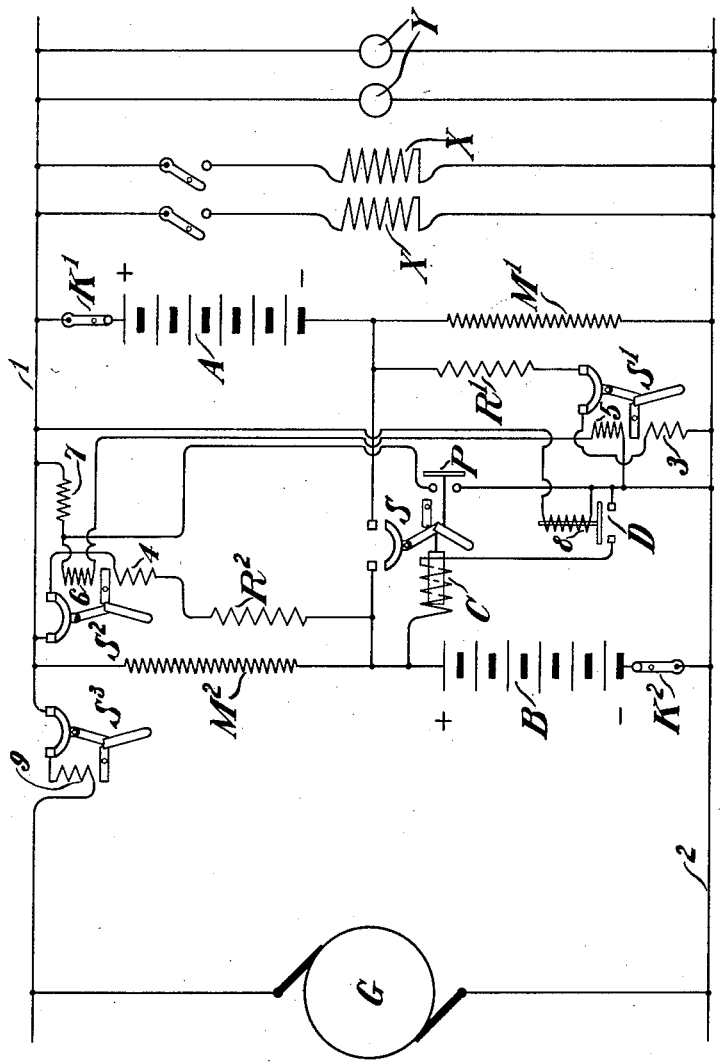
WITNESSES:
INVENTOR
Joseph Lester Woodbridge
BY
Augustus B. Stoughton.
ATTORNEY.

UNITED STATES PATENT OFFICE.

JOSEPH LESTER WOODBRIDGE, OF PHILADELPHIA, PENNSYLVANIA.

SYSTEM OF ELECTRICAL DISTRIBUTION.

1,067,631.  Specification of Letters Patent.  Patented July 15, 1913.

Application filed June 22, 1912. Serial No. 705,207.

*To all whom it may concern:*

Be it known that I, JOSEPH LESTER WOODBRIDGE, a citizen of the United States, and residing in the city of Philadelphia, State of Pennsylvania, have invented certain new and useful Improvements in Systems of Electrical Distribution, of which the following is a specification.

My invention relates to systems in which a storage battery is employed to carry the load of an electric circuit under emergency conditions when the normal source of supply is interrupted.

It is particularly applicable to systems in which it is desirable to keep the battery disconnected from the circuit under normal conditions. This requirement may be due to the fact that the voltage on the circuit is variable, and the battery if connected thereto will be obliged to charge and discharge unnecessarily; or it may be due to the fact that the number of cells is too great to permit the battery to float across the circuit without continually discharging at times when such discharge would not be required. Under these conditions it is customary to allow the battery to stand disconnected from the circuit, and automatic means are often employed to connect the battery to the circuit when required. Where the total number of cells is too great to be charged directly from the circuit the battery may be charged by the use of a charging booster, or by dividing the battery into two series which are charged from the circuit through suitable resistances. In either case several connections have to be opened and others closed if while the battery is charging it should become necessary to connect it to the circuit for emergency discharge. Furthermore, it is found that a battery is kept in healthier condition if it is so connected as to receive continually a very small amount of charging current, sufficient to keep it fully charged without overcharging, than if it stands continually on open-circuit.

The object of my invention is to provide simpler and less expensive and more reliable means for connecting the battery to the circuit for emergency discharge, and also provide means for supplying a very small charging current when the battery is not in use.

In the accompanying drawing G is a source of direct current connected to the circuit 1—2, which, for example, may be designed to supply current to the solenoids X X of remote control oil switches or to signal lamps Y. A storage battery is shown divided into two series of cells A and B. The positive terminal of the series A is connected to conductor 1 by means of the switch $K^1$, while the negative terminal of the series B is connected to conductor 2 by means of the switch $K^2$. These two switches normally remain closed. Between the two series of cells there is an automatic switch S arranged to connect the negative terminal of series A to the positive terminal of series B; thus when the switch S is closed the entire number of cells is connected in series across the circuit 1—2, and the battery is then arranged to discharge into the circuit to supply current to the apparatus X and Y. The switch S remains normally opened so long as the source G is supplying current to the circuit 1—2 at proper voltage. The switch S is provided with a closing coil C connected across the series of cells B by means of the automatic relay D. This relay is operated by a coil 8 connected across the circuit 1—2 which normally holds the relay open. If, however, the voltage across the circuit 1—2 should drop to a certain predetermined value, the coil 8 will no longer be sufficient to hold the relay D in the open position, and it will close thus exciting the coil C of the switch S and closing that switch. The battery will then discharge into the circuit 1—2 and by reason of reversal of current in the coil 9 of the underload circuit breaker $S^3$, this circuit breaker will open, disconnecting the source G.

$M^1$ and $M^2$ are resistors of high resistance connected respectively between the negative terminal of series A and conductor 2, and between the positive terminal of series B and conductor 1. These resistors serve to permit a very small amount of current to flow continually through the two series of cells in the charge direction sufficient to keep the plates in healthy condition without overcharging. The amount of current flowing through the resistors $M^1$ and $M^2$ may be made so small that this current will have no injurious effect on the cells. The resistance of these two resistors is so high that it is not necessary to disconnect them when the switch S is closed.

In order to charge the battery quickly from the circuit 1—2 in case of necessity, two other resistors $R^1$ and $R^2$ are shown which may be connected in parallel respectively with the resistors $M^1$ and $M^2$ by means of the switches $S^1$ and $S^2$. These switches may be operated automatically if desired, and as shown they are provided with overload trip coils 3 and 4 respectively, and with low voltage release coils 5 and 6. These latter coils are connected in series with each other, and with a resistor 7 across the circuit 1—2, and when excited by current from this circuit they prevent the switches $S^1$ and $S^2$ from opening except on overload. The switch S is provided with an auxiliary contact P which closes a short circuit around the two coils 5 and 6 when the switch S is closed, thus deënergizing the coils 5 and 6, and tripping the circuit breakers $S^1$ and $S^2$ in case these should be closed for charging the battery at the time when the switch S is closed for emergency discharge.

The automatic features of the switches $S^1$ and $S^2$ may not in all cases be necessary as the amount of current flowing through the resistors $R^1$ and $R^2$, when the switch S is closed, will be but little greater than when the switch S is opened. Under these conditions the current in $R^1$ will constitute an additional discharge current from the series of cells B and the current in $R^2$ will be an additional discharge from the series of cells A, but as stated above this current will be but little greater than the charging current of the battery, and it may not be objectionable to permit it to flow until the switches $S^1$ and $S^2$ can be opened by hand.

Having described my invention what I claim and desire to secure by Letters Patent is—

1. In combination, an electric circuit, two series of storage cells adapted when connected in series to discharge into the circuit, direct connections from the positive terminal of one series to the positive conductor of the circuit and from the negative terminal of the other series to the negative conductor, a resistor connected between the negative terminal of the first series and the negative conductor and a resistor connected between the positive terminal of the second series and the positive conductor, and a switch for making a direct connection between the negative terminal of the first series and the positive terminal of the second series.

2. In combination, an electric circuit, two series of storage cells adapted when connected in series to discharge into the circuit, direct connections from the positive terminal of one series to the positive conductor of the circuit and from the negative terminal of the other series to the negative conductor, a resistor connected between the negative terminal of the first series and the negative conductor and a resistor connected between the positive terminal of the second series and the positive conductor, and an automatic switch for making a direct connection between the negative terminal of the first series and the positive terminal of the second series.

3. In combination, an electric circuit, two series of storage cells adapted when connected in series to discharge into the circuit, direct connections from the positive terminal of one series to the positive conductor of the circuit and from the negative terminal of the other series to the negative conductor, a resistor connected between the negative terminal of the first series and the negative conductor and a resistor connected between the positive terminal of the second series and the positive conductor, a switch for making a direct connection between the negative terminal of the first series and the positive terminal of the second series and means responsive to the electrical condition of the circuit for closing the switch.

4. In combination, an electric circuit, two series of storage cells adapted, when connected in series, to discharge into the circuit, direct connections from the positive terminal of one series to the positive conductor of the circuit and from the negative terminal of the other series to the negative conductor, a resistor of comparatively high resistance connected between the negative terminal of the first series and the negative conductor, a resistor of comparatively high resistance connected between the positive terminal of the second series and the positive conductor, two resistors of comparatively low resistance, adapted to transmit suitable charging current from the circuit to the two series, respectively, means for connecting at will said low resistance resistors respectively in parallel with the high resistance resistors and a switch for making a direct connection between the negative terminal of the first series and the positive terminal of the second series.

5. In combination, an electric circuit, two series of storage cells adapted, when connected in series, to discharge into the circuit, direct connections from the positive terminal of one series to the positive conductor of the circuit and from the negative terminal of the other series to the negative conductor, a resistor of comparatively high resistance connected between the negative terminal of the first series and the negative conductor, a resistor of comparatively high resistance connected between the positive terminal of the second series and the positive conductor, two resistors of comparatively low resistance, adapted to transmit suitable charging current from the circuit to the two series, respectively, means for connecting at will said low resistance resistors respectively in parallel with the high resistance resistors, a switch for making a direct connection between the negative terminal of the first series and the positive terminal of the second series, and means actuated upon the closing of said switch for disconnecting the charging resistances.

In testimony whereof I have hereunto signed my name.

JOSEPH LESTER WOODBRIDGE.

In the presence of—
A. N. DINGEE,
H. M. TAYLOR.